United States Patent [19]

Brochot et al.

[11] Patent Number: 5,093,153

[45] Date of Patent: Mar. 3, 1992

[54] METHOD OF MAKING COATED GLASS SUBSTRATES

[75] Inventors: Jean-Pierre Brochot, Paris; Philippe Sohier, Liancourt, both of France; Bruno Ceccaroli, Svelgen, Norway

[73] Assignee: Saint Gobain Vitrage International, Courbevoie, France

[21] Appl. No.: 306,960

[22] Filed: Feb. 7, 1989

Related U.S. Application Data

[62] Division of Ser. No. 943,336, Dec. 17, 1986, abandoned.

Foreign Application Priority Data

Dec. 17, 1985 [FR] France ............... 85 18673

[51] Int. Cl.$^5$ ............... B05D 3/06; B05D 5/06
[52] U.S. Cl. ............... 427/41; 65/60.8;
427/38; 427/109; 427/126.2; 427/126.3;
427/165; 427/229; 427/255; 427/255.6;
427/294; 427/377; 427/387; 427/166
[58] Field of Search ............... 427/41, 38, 165, 166,
427/229, 109, 296, 377, 255, 387, 255.6, 126.3,
126.2; 65/60.8; 428/428, 429, 432, 433, 447,
448, 450, 469, 702, 333, 336, 446, 457, 469, 213,
215

[56] References Cited

U.S. PATENT DOCUMENTS

| | | | |
|---|---|---|---|
| 3,185,586 | 5/1965 | Saunders et al. | 428/702 |
| 3,522,075 | 7/1970 | Kiel | 428/432 |
| 3,822,928 | 7/1974 | Smolinsky et al. | 427/38 |
| 4,017,661 | 4/1977 | Gillery | 428/702 |
| 4,096,315 | 6/1978 | Kubachi | 427/41 |
| 4,118,540 | 10/1978 | Amort et al. | 428/429 |
| 4,235,951 | 11/1980 | Swarovski | 428/432 |
| 4,341,841 | 7/1981 | Ohno et al. | 428/433 |
| 4,358,507 | 11/1982 | Senaha et al. | 428/432 |
| 4,368,236 | 1/1983 | Frye | 428/447 |
| 4,374,158 | 2/1983 | Taniguchi | 427/41 |
| 4,401,695 | 8/1983 | Sopko | 427/168 |
| 4,450,201 | 5/1984 | Brill et al. | 428/432 |
| 4,497,700 | 2/1985 | Groth et al. | 428/432 |
| 4,562,091 | 12/1985 | Sachdev et al. | 427/41 |
| 4,562,095 | 12/1985 | Coulon et al. | 427/180 |
| 4,590,118 | 5/1986 | Yatabe et al. | 428/469 |
| 4,649,071 | 3/1987 | Tajing et al. | 427/38 |
| 4,663,414 | 5/1987 | Estes et al. | 428/447 |
| 4,677,004 | 6/1987 | Das et al. | 428/447 |
| 4,710,426 | 12/1987 | Stephens | 428/450 |
| 4,714,769 | 12/1987 | DeAntoniis et al. | 428/429 |
| 4,722,878 | 2/1988 | Watanabe et al. | 428/432 |
| 4,765,729 | 8/1988 | Taniguchi | 427/164 |
| 4,778,721 | 10/1988 | Sliemes et al. | 427/38 |

OTHER PUBLICATIONS

Vossen et al., *Thin Film Processes*, pp. 11, 12, 27, 28, Academic Press, Inc., 1978.
Chemical Abstracts, vol. 103, #6, No. 41387V.
Biederman, "Deposition of Polymer Films in Low Pressure Reactive Plasmas", 86, *Thin Solid Films*, (1981), p. 125.

*Primary Examiner*—Janyce Bell
*Attorney, Agent, or Firm*—Pennie & Edmonds

[57] ABSTRACT

A coated object comprising a glass substrate and an organomineral film, such as an organosilicon compound, deposited upon at least a portion of the glass substrate wherein the coating is of a sufficient thickness and has a sufficient refractive index so as not to absorb energy within the visible spectrum. The object may additionally comprise at least one coating layer interposed upon the substrate beneath the organomineral film to improve the optical properties of the coated object. A method for making the coated object of the invention is described wherein a plasma deposition process is utilized to deposit the organomineral film upon the surface of the glass or glass-based substrate. Methods are also disclosed for the production of antiglare surfaces upon coated substrates as well as barrier surfaces to prevent the migration of alkaline ions out of the glass substrate and a method to reduce or mitigate the speckling or irridescence effect in a layer formed upon a glass substrate by pyrolytic decomposition of a metal-based powder.

20 Claims, 2 Drawing Sheets

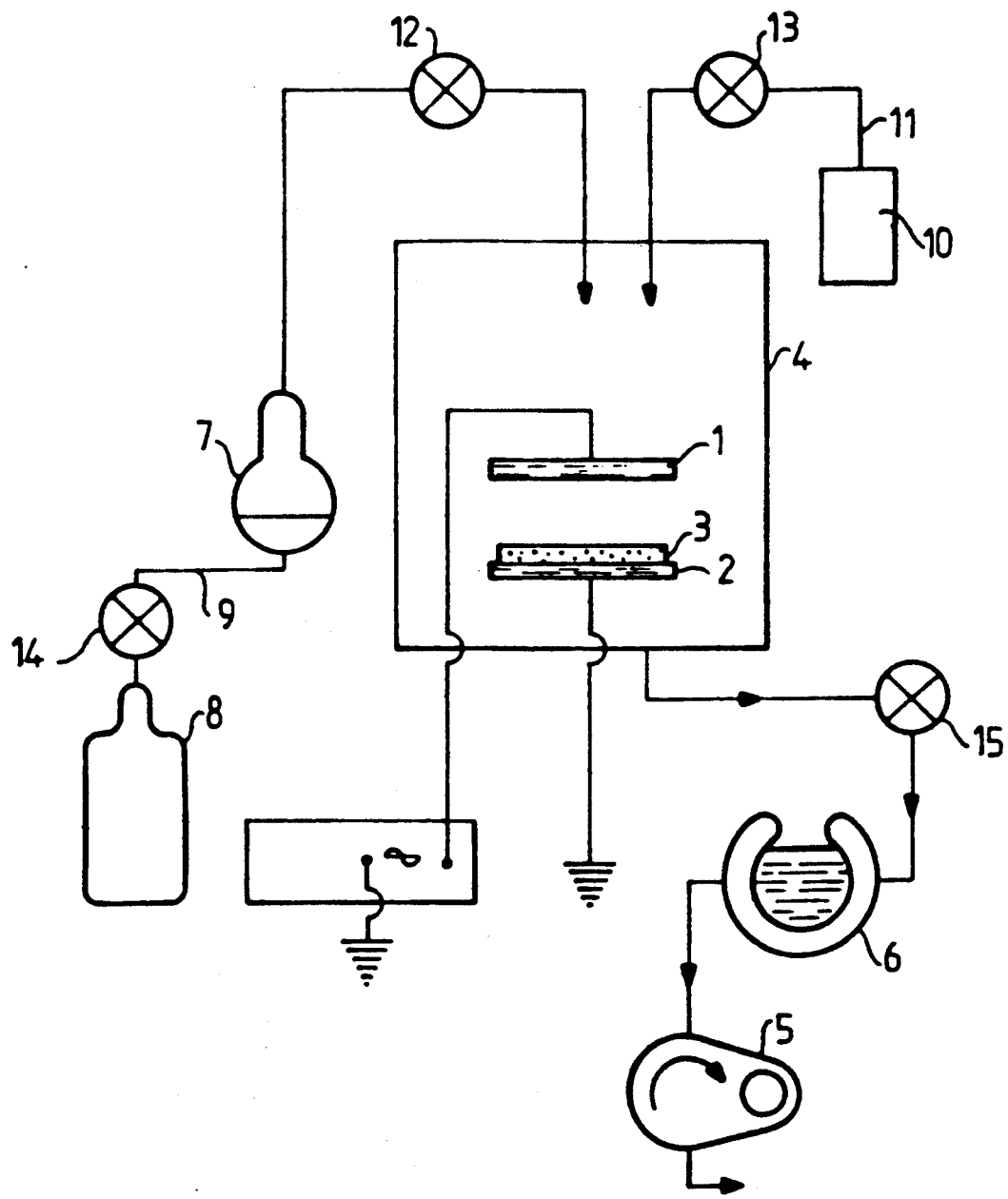
FIG_1

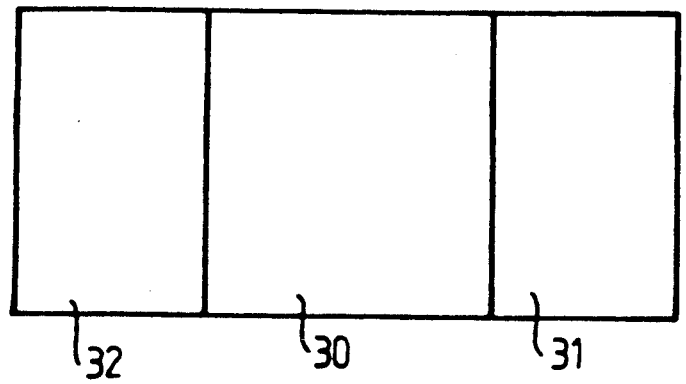
FIG_2
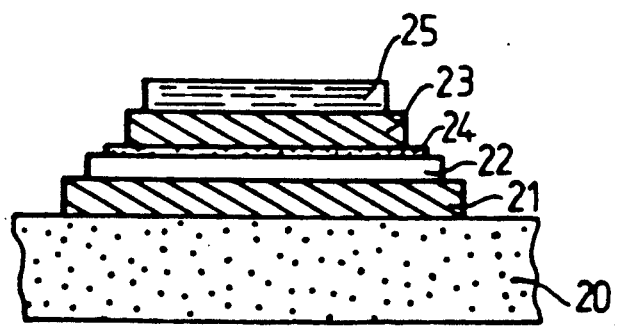
FIG_3

METHOD OF MAKING COATED GLASS SUBSTRATES

This is a division of application Ser. No. 06/943,336 filed Dec. 17, 1986, now abandoned.

FIELD OF THE INVENTION

The invention relates to the deposition of organomineral films on glass substrates which have been optionally prelayered with one or more additional coatings including at least one metal layer.

BACKGROUND OF THE INVENTION

Numerous techniques for depositing a variety of coating materials upon the surface of glass substrates, for the purpose of strengthening or reinforcing their surfaces or providing such surfaces with improved optical and/or electrical properties, have been set forth in the prior art. For example, French Patent Application no. 2,542,636 discloses a glass substrate coated with a dielectric layer of tin oxide overlayed with a coating comprising the pyrolysis products produced by the interaction of a metal-based powder and the heated substrate.

One coating technique which has previously been utilized to deposit coatings onto the surface of materials other than glass is known as plasma deposition. The method entails introducing the material to be coated into a reaction chamber provided with a low-energy electrical field. This technique has been used, as described in French Patent Application no. 2,535,650, to deposit a siloxane polymer on a flexible plastic film which has first been coated with a series of thin metal layers. This process results in the production of a flexible insulating material which is thereafter applied to a rigid support, such as a pane of glass, the production and shaping of which having already been completed.

This technique, i.e., plasma deposition, has, however, not been previously used in the field of glass manufacture to form coating layers exhibiting improved abrasion resistance and having improved optical properties directly upon the glass or upon pre-coated glass substrates, when the coated product must subsequently undergo standard processing treatments, i.e., bending, tempering, etc.

SUMMARY OF THE INVENTION

Applicants have now discovered that coatings of an organomineral film such as, for example, an organosilicon compound, may be polymerized during deposition from a plasma and applied directly to glass substrates or to materials having a glass base with one or more prelayered coatings, at least one of which is a metal coating, covering at least a portion thereof, in order to produce a product which is transparent, non-absorptive in the visible spectrum, resistant to abrasion and wherein such coating will not be altered or damaged by further treatment of the coated glass product, i.e., by bending, tempering, etc.

One object of the present invention is the development of a simplified method for the formation of a protective organosilicon film upon a glass substrate or one having a glass base.

A further object of the present invention is to produce a coating of an organosilicon compound upon a glass or glass-based substrate previously coated with at least one thin metal layer.

Another object of the present invention is to permit the coating of only flat glass substrates utilizing simple coating installations and optionally subjecting such coated substrates to such additional processing steps as shaping and/or tempering without disturbing the coating thereon.

An additional object of the invention is to produce a coated substrate wherein a base layer of a pyrolyzed metal compound, produced by heating and subsequently oxidizing a powdered metal-based compound such as dibutyltin oxide, dibutyltin fluoride, indium oxide and the like, is overlayed with a polymerized, plasma-deposited organosilicon film.

Also proposed is a device for depositing organosilicon films of the type described above upon glass substrates wherein the system for producing the electrical discharge required for the plasma deposition of the polymer film is installed within an input or an output lock of a vacuum bell jar in which additional layers, including at least one metal layer, are deposited.

The present invention therefore concerns coated objects and methods for producing these objects. The coated object of the invention comprises a glass substrate with a transparent coating of an organomineral film, created by the deposition of for example, an organosilicon compound. The object may further comprise at least one additional coating layer interposed between the substrate and the organosilicon film, wherein the additional coating features at least one metal layer which may be obtained by the pyrolytic decomposition of a metal-based compound upon the surface of the substrate or under vacuum conditions.

In one embodiment of the invention, the thickness of the organosilicon film deposited on the surface of the substrate ranges between about 20 nanometers and 2 microns. Additionally, the refractive index of the resultant film ranges between about 1.35 and 1.6, preferably on the order of about 1.45. The effect of this organosilicon coating is to permit an improvement in the optical properties of the coated object and permitting further treatment of the object, i.e. tempering or bending operations, without producing an adverse effect upon the coating.

One embodiment of the coated substrate may comprise, for example, a glass or glass-based substrate which is coated with a first layer of a dielectric material, such as tin oxide, a second layer of a precious metal such as silver to improve the optical properties of the film, a third layer of the dielectric material to prevent the oxidation of the silver layer, and a protective upper coating of an organosilicon film.

An alternate embodiment of the invention comprises the addition of a second metal layer, such as aluminum, titanium, tantalum, chromium, manganese, zirconium and copper, between the third dielectric layer and the layer of precious metal. This additional metal layer serves to prevent the oxidation of the layer of precious metal, particularly when the third layer of the dielectric material is to be deposited in an oxidizing atmosphere.

A further embodiment comprises the replacement of the uppermost dielectric layer with an additional coating of an organosilicon film which may be deposited separately or as one with the outermost, protective layer of such film. When this embodiment of the invention is prepared, there can be also no longer any need for the second metal layer since oxidation of first metal layer is no longer a problem due to the absence of an upper layer of the dielectric material.

A still further embodiment is the formation of a barrier layer of an organosilicon film bonded directly to the surface of the glass substrate. The presence of this layer forms an effective barrier to the migration of ions contained within the substrate itself into the thin metal or metal oxide layers deposited thereupon It further prevents the formation of a whitish veil at the interface between the substrate and the first layer when this layer is obtained from compounds containing a halide.

The means for coating the organosilicon layer upon the substrate is known as plasma deposition. This process comprises placing the substrate to be coated into an enclosure maintained at a low vacuum pressure, introducing a supply of an organosilicon monomer in gaseous form into the enclosure and creating an electrical discharge between two electrodes placed in a minimal distance, such as 2 cm. apart, wherein one of the electrodes is grounded and supports the substrate to be coated while the other electrode is connected to electrical generating means. In one embodiment of the invention, the electrical generating means may comprise an electrical generator capable of operation at between about 10–100 KHz.

In an alternate embodiment of the invention, the monomer may be entrained in a stream of carrier gas prior to its introduction into the vacuum enclosure. Further, oxygen may be added to the gas-entrained monomer in an amount of up to about 50% of the carrier gas.

In a further embodiment, at least one additional coating layer may be interposed upon the surface of the glass substrate in a vacuum chamber prior to the deposition of the organosilicon coating. In such a case, the vacuum chamber may then be utilized for the plasma deposition of the organosilicon coating as well. In order to practice this process, the plasma deposition apparatus may be located within an inlet lock or an outlet lock of the vacuum chamber or a supplementary chamber which is attached to the working chamber.

In a still further embodiment of the invention, the outermost organosilicon layer may be subjected to an annealing process at a temperature of between about 350–500° C. subsequent to its deposition. This process thus lowers the refractive index of the resultant coated substrate This serves to mitigate the irridescence or "speckling" of the coated substrate which sometimes appears due to slight variations in the coating thickness, and to produce a coating having "antiglare" properties which is useful for many industries.

The plasma deposition of such organosilicon compounds offers the following advantages which render it an industrially useful method:

The process may be carried out in an environment requiring the maintenance of only a low vacuum, i.e., 0.1–10 torr;

Supplying the material to be deposited in gaseous form eliminates the necessity of closely monitoring the feed mixture and recycling complex by-products while making it possible to provide homogenous, carefully measured reaction mixtures; and The process disclosed herein requires a minimal consumption of electrical energy to produce the plasma field and may be performed at ambient temperature.

BRIEF DESCRIPTION OF THE DRAWINGS

Further benefits and advantages of the invention will become apparent from the following description given with reference to the accompanying drawing figures which specify and show preferred embodiments of the present invention and wherein:

FIG. 1 is a schematic representation of applicants' plasma deposition system:

FIG. 2 is a block diagram illustrating the alternative locations for applicants' plasma deposition apparatus when utilized in conjunction with a vacuum bell jar for substrates requiring vacuum coating; and FIG. 3 is a cross-sectional representation of a glass substrate which has been pre-layered with a number of coatings prior to the deposition of an organosilicon coating.

DETAILED DESCRIPTION OF THE PREFERRED EMBODIMENTS

Referring initially to FIG. 1 there is illustrated a schematic representation of a system utilized by applicants to achieve a polymeric coating of a plasma-deposited organosilicon monomer upon a glass or glass-based substrate. Such transparent coatings do not absorb energy in the visible spectrum and are deposited in a thickness between about 200 angstroms and 2 microns (i.e., $0.02\mu-2\mu$) with an index of refraction $(R_I)$ ranging between about 1.35–1.60 and preferably on the order of $R_I$=about 1.45.

The plasma is produced due to an electrical discharge created by the capacitive coupling between spaced-apart electrodes 1, 2. These electrodes are preferably spaced a distance of 2 cm. from each other in order to achieve peak performance. Electrode 2 is grounded and carries glass substrate 3 which is to be coated with the organosilicon polymer. Electrode 1 is connected to electric generator 16, preferably having a maximum power output of 800 watts. In order to obtain a homogenous deposit having a uniform thickness over the entire surface of substrate 3, the coating operation is preferably performed at frequencies ranging between 10–100 KHz.

The polymer deposition zone between electrodes 1, 2 is situated within enclosure 4. The area within enclosure 4 is maintained at a low vacuum pressure, preferably on the order of about 0.1–10 torr. by vacuum pump 5 which is connected to enclosure 4 through liquid nitrogen trap 6 and valve 15.

The organosilicon monomer which is to be polymerized and coated by plasma deposition upon glass substrate 3 is stored within tank 7. The monomer may be introduced into enclosure 4 through valve 12 by a variety of techniques One such method of introduction comprises injecting the monomer by itself into enclosure 4 wherein it subsequently vaporizes due to its saturating vapor pressure. A preferred technique includes entraining the monomer within a carrier gas such as argon supplied by gas cylinder 8 which is routed through valve 14 and into the monomer in tank 7 by conduit 9.

Applicants have, in addition, determined that the addition of oxygen to the carrier gas or to the monomer introduced into enclosure 4 without the use of a carrier gas, in a proportion preferably ranging up to about 50%, promotes the formation of useful polymers within the plasma-deposited coating and improves both the durability and performance of the coating, due to the formation of bonds between the oxygen and the monomer units which constitute the polymer. In situations where a carrier gas is not used or when oxygen is not initially mixed with the carrier gas, a tank 10 of a plasmagenic gas, preferably argon, optionally coupled with a supply of oxygen, is directed into enclosure 4 by conduit 11 through valve 13. The oxygen may also be independently introduced into enclosure 4.

Referring now to FIG. 2, in instances such as those in which the substrate is to be pre-layered with at least one metal coating prior to the deposition of the organosilicon layer, wherein such coating is to be deposited thereupon in a vacuum, it is commercially advantageous to make use of this vacuum for the deposition of the organosilicon coating as well. FIG. 2 illustrates, in the form of a block diagram, a vacuum working chamber 30 wherein thin metal layers may be deposited upon the substrate by thermal evaporation or by cathode sputtering, with or without the use of a magnetron. Working chamber 30 is preceded by input lock 31 and followed by output lock 32. The plasma deposition system schematically illustrated in FIG. 1 may be installed within one of input or output locks 31, 32 or in a supplementary chamber (not shown) attached to working chamber 30.

The organosilicon monomers utilized by applicants for the plasma deposition of their polymeric coating preferably include compounds such as hexamethyldisiloxane (HMDOS), hexamethyldisilazane (HMDS) and in general alkylsilizanes, vinyltrimethoxysilane (VTMOS), vinyldimethylethoxysilane (VDMEOS), dimethyldiethoxysilane (DMDEOS), trimethylethoxysil (TMEOS), tetramethoxysilane (TMOS) and generally alkoxysilanes and alkylsilanes. It is further believed, however, that any organosilicon monomer will work with the present invention. Depending upon the intended application for the coatings of the invention, the organosilicon film may be deposited directly upon the substrate or upon one or more layers of metal and/or metal-oxide coatings previously deposited upon the substrate.

When a coating is desired having a low $R_f$ for a particular application, the organosilicon-coated substrate may subsequently be subjected to an annealing heat treatment which comprises exposing the coated substrate, in an ambient or a regulated atmosphere, to a temperature compatible with the substrate which is greater than about 350° C., preferably ranging between about 370-500° C. An atmosphere comprising an inert gas is preferred when layers of an unoxidized metal, such as silver, are deposited prior to the organosilicon film.

A preferred application for the organosilicon coating of applicants' invention is to constitute a protective film over previously deposited thin coating layers on glass substrates, particularly when these layers include an oxidizeable metal layer which is otherwise subject to corrosion in the absence of such a protective film.

Thus, with reference to FIG. 3, a glass substrate 20 is represented having a "stack" of thin layers 21-24 deposited thereupon under vacuum conditions. The article depicted in FIG. 3 comprises, besides substrate 20, a first dielectric layer 21, preferably comprising tin oxide, in direct contact with substrate 20, overlayed by a layer 22 of metal such as silver which is then covered with a second dielectric layer 23 preferably also comprising tin oxide.

Optionally, an additional metal layer 24 of a metal such as aluminum, may be deposited and serve as an interface between metal layer 22 and dielectric layer 23. This metallic layer is preferably deposited in a thickness of between about 0.1-6 nanometers and may comprise, in place of aluminum, titanium, tantalum, chromium, manganese, zirconium, copper or alloys thereof. The deposition of layer 24, does not modify the characteristics of the stack, but it does prevent the oxidation of metal layer 22 located directly below, especially when dielectric layer 23 is to be deposited in an oxidizing atmosphere.

According to the invention, layer 23 is subsequently covered with a coating 25 of an organosilicon polymer by plasma deposition. Coating 25 provides, as demonstrated below, improved resistance to the corrosion of the underlying layers and a greater tolerance for subsequent thermal treatment of the coated substrate than substrates lacking such polymer coatings. In order to demonstrate this feature of the invention, two such coated glazings, one being coated with the organosilicon polymer and one without such a protective topcoat, were placed within a climactic test cabinet at 85° C. with 95% relative humidity. After several hours in such an environment, the glazing which was not provided with the organosilicon coating had developed a pitted, i.e., corroded, surface whereas the glazing protected by the polymeric coating remained intact.

Applicants have determined that an organosilicon film thickness on the order of about 200 nanometers is preferable to impart excellent protection against corrosion wherein the resultant emissivity of the coated substrate is not degraded. It has also been discovered that thinner organosilicon coatings, i.e., those having a thickness of between about 10 and 100, more specifically between about 40-80 nanometers are also effective. Polymeric coating thicknesses greater than about 200 nanometers still provide excellent protection against corrosion but such layers suffer an increased absorption of infrared radiation and consequently, a reduction in the emissivity of the coated substrate. The values found in Table I, set forth below, clearly demonstrate these features of applicants' plasma-deposited coating.

TABLE I

| Thickness of the organosilicon coating (in nanometers) | Emissivity of the glazing film |
| --- | --- |
| 0 | 0.09 |
| 80 | 0.10 |
| 100 | 0.10 |
| 150 | 0.10 |
| 200 | 0.11 |
| 300 | 0.11 |
| 600 | 0.15 |
| 700 | 0.22 |
| 1100 | 0.27 |

Additional tests were also performed by the applicants to determine the thermal resistance of pre-coated substrates provided with a layer stack comprising tin oxide/silver/aluminum/tin oxide and protected by a layer of the organosilicon polymer compared to such stacks which lack such a protective layer of the organosilicon. For purposes of determining these values, the various glazings were subjected to thermal annealing treatments at temperatures on the order of about 630° C. in air for a period of about five minutes. Following this treatment, the emissivity of each of the coated substrates was measured and compared with the value obtained prior to such treatment. The results of these tests, as set forth in Table II below, demonstrate that, in the case of coated substrates covered by an organosilicon film, the emissivity values obtained subsequent to the annealing treatment were very similar to those obtained before such treatment while conversely, the emissivity values were markedly lowered for substrates lacking such an organosilicon coating.

TABLE II

| Thickness of the organo-silicate coating layer prior to annealing (nm.) | Annealing temperature | Duration of annealing step | Emissivity |
|---|---|---|---|
| 80 | 600 | 2 mins. 45 secs. | 0.18 |
| 80 | 630 | 5 mins. | 0.20 |
| 80 | 615 | 2 mins. 15 secs. | 0.17 |
| 80 | 630 | 5 mins. | 0.18 |
| 100 | 630 | 5 mins. | 0.17 |
| 130 | 630 | 5 mins. | 0.21 |
| 140 | 630 | 3 mins. | 0.18 |
| 160 | 660 | 5 mins. | 0.21 |
| 160 | 630 | 5 mins. | 0.20 |
| 220 | 630 | 5 mins. | 0.21 |
| 240 | 630 | 5 mins. | 0.16 |
| 290 | 630 | 5 mins. | 0.23 |
| 300 | 630 | 5 mins. | 0.24 |
| 320 | 630 | 5 mins. | 0.16 |
| 600 | 630 | 5 mins. | 0.22 |
| 600 | 660 | 5 mins. | 0.28 |
| 600 | 660 | 5 mins. | 0.20 |
| 680 | 620 | 2 mins. 45 secs. | 0.20 |
| 1080 | 630 | 5 mins. | 0.27 |
| 0 | 630 | 5 mins. | 0.75 |
| 0 | 0 | 0 mins. | 0.09 |

This supports the applicants' contention that metal-coated glass substrates provided with a protective organosilicon coating may be heated so as to facilitate the bending or tempering of such coated substrates without adversely affecting the properties of the metal layer.

An additional application, to which the organosilicon coatings of applicants' invention may be applied is the utilization of the optical properties possessed by such coatings to improve the optical performance of the glazings which they cover. In the case of glazings having a low emissivity value, the interferential properties of the organosilicon coating may be relied upon to improve their optical performance.

Thus, for example, in a coated substrate of the type represented in FIG. 3, comprising a stack of coating layers as described with reference to said Figure, and the dielectric layer 23 may be replaced by a plasma-deposited organosilicon coating. The thickness of the organosilicon may be varied as necessary to achieve specific optical properties. The presence of layers of a composition such as described above, both above and below these organosilicon layers, must also be taken into account in determining the necessary thickness of the organosilicon layers. When dielectric layer 23 is replaced by an organosilicon coating, layer 25 can be deposited as a separate layer of organosilicon or the two layers may be merged into a single layer whose dimensions may be varied as necessary, depending upon the application required for the coated substrate.

Further, when dielectric layer 23 is replaced by an organosilicon coating which has been plasma-polymerized in the absence of oxygen, metal-based layer 24 is no longer required since the oxidation which was known to occur during the deposition of the tin oxide is no longer to be feared. Since, however, the presence of oxygen is often desired during the deposition of the organosilicon coating in order to obtain specific polymers and/or to obtain a harder, more solid film, the metal-based layer 24 is often retained.

In an alternate embodiment, the organosilicon coating of the invention may be overlayed onto the surface of a glass substrate which has been precoated with at least one coating layer obtained by the pyrolytic decomposition of a powder compound. Glazings of this type are characterized as being slightly tinted, the degree tint corresponding to the thickness of the pyrolytic layer. In addition, portions of the layer may be irridescent or "speckled" due to slight variations in the thickness thereof. The plasma deposition of an organosilicon coating upon layered substrates suffering from these defects has been shown to mitigate this speckling and/or irridescence effect. The extent to which this occurs is dependent upon the $R_I$ of the organosilicon coating with the results improving as the $R_I$ of the polymer coating decreases. Therefore, it is preferred to anneal the organosilicon films which are utilized for this application since this process has been shown to reduce the $R_I$ of these coatings.

An example of this process is the formation of a coated glass substrate having, for example, a tin-oxide based pyrolyzed layer 180 nanometers thick which has been plasma-coated with an organosilicon film (e.g., VDMEOS). This polymer film has a measured thickness of 150 nanometers before it is annealed. Subjecting it to an annealing process at 450° C. reduces this thickness to 100 nanometers. Such pyrolyzed layers with a base layer of tin oxide are described in French Patent Application no. 2,542,363, discussed above. The above-described techniques for mitigating the effect of speckling or irridescence on the surface of such coatings may be applied to substrates provided with a base coating of tin oxide, as well as other metal-based compounds such as indium oxide and the like.

A further preferred embodiment of the use of organosilicons to improve the optical properties of such coated glass substrates concerns the production of antiglare coatings on glass surfaces. Such surfaces may be considered as "antiglare" when they have a $R_I=n$ such that $n^2=n_s$ wherein $n_s$ is the index of the substrate which carries the coating. The applicants have therefore determined that the $R_I$ of organosilicon coatings may be lowered to a value of 1.35 by annealing the coated glazing at a temperature on the order of at least about 350° C.

Applicants have found that, for example, if the substrate is glass with a $R_I$ (i.e., $n_s$) = 1.518, the deposition of a film having a $R_I=1.37$ and having a thickness between 20 and 200 nanometers, preferably on the order of about 100 nanometers, upon this substrate greatly mitigates the reflectance of the uncoated substrate. The lowest reflectance measured for the treated glass is 1.5% for each face of the substrate and the treated surfaces are highly achromatic. Of course, the two faces of the substrate may also have been covered and/or the substrate may have been coated to modify its $R_I$ prior to the deposition of the organosilicon film upon the substrate.

Thus it is possible to plasma-coat a substrate with a variety of different organosilicon layers or even a number of layers of different organomineral compounds covered with a layer of plasma-deposited organosilicon wherein each layer has a different $R_I$. It has been found to be particularly efficient to deposit the various layers in order of decreasing $R_I$ from the surface of the substrate to the uppermost layer. Glazings produced in this manner have been found to be particularly effective for the construction industry, the automobile industry and also for the optical, i.e., eyeglass, industry.

A further attribute of applicants' organosilicon coating is the ability to impart a variety of colors, depending upon the thickness utilized, to the coated substrate.

An additional application for the use of applicants' coatings is the formation of barrier layers forming an obstacle to the migration of ions contained in the substrate itself or in the layers deposited atop said substrate. For example, it is well-known that alkaline ions, particularly sodium ions, will migrate into thin metal or metal oxide layers deposited upon the glass substrate which, on the one hand, reduces their optical and electrical properties and, on the other hand, forms a whitish veil at the interface between the substrate and the first thin layer when said layer is obtained from a compound comprising a halide.

Therefore, a plasma-deposited organosilicon film deposited directly upon the surface of a glass substrate blocks the migration of such ions beyond this film and thus avoids the drawbacks noted in the prior art. Thus an organosilicon film of a thickness on the order of about 20-200 nanometers, comprising, for example, a polymer of the HMDS monomer, may be deposited directly upon the surface of the glass substrate prior to the deposition of a layer of tin oxide or a layer of metal produced either by the pyrolytic decomposition of a metal-based powder, chemical vapor deposition or a vacuum deposition technique, without disturbing the optical or electrical properties of the coated substrate.

Of course, it must be understood that an organosilicon film may perform more than one function. In addition, a glass substrate optionally coated with one or more metal-based layers, may have several plasma-deposited organosilicon layers which are intended to perform a variety of functions.

Thus, for example in the coated glass substrate represented in FIG. 3, applicants have determined that the deposition of a first organosilicon layer 25 upon the uppermost surface of the coating stack will improve the corrosion resistance of the coated substrate as well as its ability to undergo thermal treatment, such as for bending or tempering procedures, without incurring any damage to the coating layers. A second such film, optionally merged with layer 25, may, as previously discussed, replace dielectric layer 23 which is deposited above thin metal layer 24. This second organosilicon layer performs a protective function and provides the coated substrate with improved optical properties. In addition, it is also permissible to replace dielectric layer 21, which is in direct contact with substrate 20, with a plasma-deposited layer of an organosilicon. This aids in bonding the metal-based layer 22 to substrate 20 and serves as a barrier to the migration of alkaline ions out of substrate 20 and into metal-based layer 22. Further, this optional barrier layer also serves to improve the optical properties of the coated substrate.

Thus, one may provide a coated substrate which is simplified over that depicted in FIG. 3 but which is able to provide the same level of service for comparable applications. Thus, by way of a nonlimiting example, in place of the coated glazing of FIG. 3 depicting a stack of coating layers comprising tin oxide/silver/aluminum/tin oxide, a float glass 4 mm. thick may have deposited thereupon a film of the organosilicon polymer of the invention having a thickness of 55 nanometers overlayed with a coating of silver 10 nanometers in thickness and covered by a second organosilicon layer of 55 nanometers, providing that the thickness of the silver layer is the same in both coated substrates.

The emissivity of these two glazings has been determined to be equivalent.

It must be further understood that the various organosilicon films described above may be produced by the polymerization of the same or different monomers.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

We claim:

1. A method for making coated objects which comprises:
    fabricating a glass substrate; and
    coating, by a plasma deposition process, at least a first layer of an organosilicon monomer upon said substrate and polymerizing said monomer upon said substrate, wherein said coating and said polymerization are performed in a single step, and wherein said plasma is produced with an electrical generator operating at a frequency of between about 10-100 kHz.

2. The method according to claim 1 wherein said method further comprises interposing at least one coating layer upon said glass substrate beneath said layer of said organosilicon monomer to improve the optical the optical properties of said coated object.

3. The method according to claim 2 wherein said interposed coating is a metal layer.

4. The method according to claim 2 wherein said interposed coating layer is deposited upon said substrate by pyrolytically decomposing a powdered, metal-based compound upon the surface of the substrate.

5. The method according to claim 1 wherein said plasma deposition process comprises:
    placing said substrate to be coated into an enclosure maintained at a low vacuum pressure;
    introducing a supply of an organosilicon monomer in gaseous form into said enclosure; and
    producing an electrical discharge between two electrodes within said enclosure, so as to polymerize said monomer upon said substrate wherein one of said electrodes is grounded and supports the substrate to be coated while the other electrode is connected to electrical generating means.

6. The method according to claim 5 which further comprises entraining said monomer in a carrier gas prior to introducing it into said enclosure.

7. The method according to claim 5 which further comprises introducing oxygen into said enclosure to facilitate the polymerization of said monomer.

8. The method according to claim 7 wherein said oxygen may be added in an amount of up to about 50% of the volume of said carrier gas.

9. The method according to claim 1 which further comprises annealing said organosilicon monomer layer subsequent to its formation upon said substrate in order to reduce the refracture index of said coating.

10. The method of claim 9 wherein said coated object is annealed at between about 350-500° C.

11. The method of claim 9 which further comprises performing said annealing step in an inert atmosphere.

12. The method according to claim 1 which further comprises tempering said coated substrates without adversely affecting the emissivity of said coated substrates.

13. A method for making coated glass objects which comprises:

fabricating a glass substrate;

placing said substrate to be coated into an enclosure maintained at a low vacuum pressure;

entraining a supply of an organosilicon monomer in a carrier gas;

introducing said gas-entrained monomer into said enclosure;

adding a supply of oxygen, comprising up to about 50% of the amount of said carrier gas used, to said gas-entrained monomer within said enclosure; and producing an electrical discharge between two electrodes placed on the order of about 2 cm. apart within said enclosure so as to polymerize said monomer upon said substrate, wherein one of said electrodes is grounded and supports the substrate to be coated while the other electrode is connected to an electrical generator operable at frequencies of between about 10-100 kHz.

14. A method for mitigating speckling or iridescence effects in a layer obtained by pyrolytic decomposition of a powder upon a glass substrate which comprises coating, by a plasma deposition process, at least a first layer of an organosilicon monomer upon at least a portion of said substrate and polymerizing said monomer upon said substrate, wherein said coating and said polymerization are performed in a single step in order to reduce or mitigate said speckling or iridescence effect within said pyrolyzed layer, and wherein said coating is of a sufficient thickness and has a sufficient refractive index so as not to absorb energy within the visible spectrum, and further wherein said plasma is produced with an electrical generator operating at a frequency of between about 10-100 kHz.

15. The method according to claim 14 wherein said organomineral film is a film of an organosilicon monomer.

16. A method for producing an antiglare surface upon a coated glass substrate which comprises:

coating, by a plasma deposition process, at least a first layer of an organosilicon monomer upon at least a portion of said substrate and polymerizing said monomer upon said substrate, wherein said coating and said polymerization are performed in a single step, wherein said coating is of a sufficient thickness and a sufficient refractive index so as not to absorb energy in the visible spectrum, and wherein said plasma is produced with an electrical generator operating at a frequency of between 10-100 kHz; and annealing said coated glass substrate so as to lower the refractive index of said coating such that the square of the refractive index of the coated substrate is about equal to the index of the refraction of the substrate without such a coating, in order to reduce the glare from the surface of said coated substrate.

17. The method according to claim 16 wherein said organomineral film is a film of an organosilicon monomer.

18. A method for producing a barrier layer upon a coated glass substrate which comprises bonding to at least a portion of said substrate a film of an organosilicon compound, said film formed in a single step by a plasma deposition process wherein said plasma is produced by an electrical generator operating at a frequency of between about 10-100 kHz, so as to form an obstacle to the migration of alkaline ions out of said substrate.

19. A method for making coated objects which comprises:

fabricating a glass substrate;

coating by plasma deposition process, at least a first layer of an organosilicon monomer upon said substrate and polymerizing said monomer upon said substrate, wherein said coating and said polymerization are performed in a single step and wherein said coating and said plasma is produced with an electrical generator operating at a frequency of between about 10-100 KHz; and bending said coated substrates without adversely affecting the emissivity of said coated substrates.

20. The method according to claim 1 wherein said plasma deposition process comprises;

placing said substrate to be coated into an enclosure maintained at a low vacuum pressure;

introducing a supply of an organosilicon monomer in gaseous form into said enclosure; and producing an electrical discharge between two electrodes placed on the order of about 2 cm. apart within said enclosure so as to polymerize said monomer upon said substrate, wherein one of said electrodes is grounded and supports the substrate to be coated while the other electrode is connected to an electrical generator operable at frequencies of between about 10-100 kHz.

* * * * *